(12) United States Patent
Fitzhugh (10) Patent No.: US 7,734,622 B1
(45) Date of Patent: Jun. 8, 2010

(54) MEDIA-DRIVEN BROWSING

(75) Inventor: Andrew Fitzhugh, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 919 days.

(21) Appl. No.: 11/090,409

(22) Filed: Mar. 25, 2005

(51) Int. Cl.
G06F 17/30 (2006.01)

(52) U.S. Cl. ............................ 707/722; 707/913

(58) Field of Classification Search ............ 707/722, 707/743, 758
See application file for complete search history.

(56) References Cited

U.S. PATENT DOCUMENTS

| | | | |
|---|---|---|---|
| 5,765,154 A * | 6/1998 | Horikiri et al. ............. | 1/1 |
| 6,038,560 A * | 3/2000 | Wical ......................... | 1/1 |
| 6,249,784 B1 * | 6/2001 | Macke et al. ............... | 1/1 |
| 6,480,853 B1 | 11/2002 | Jain | |
| 6,490,579 B1 * | 12/2002 | Gao et al. .................. | 1/1 |
| 6,504,571 B1 * | 1/2003 | Narayanaswami et al. .................. | 348/231.99 |
| 6,523,023 B1 | 2/2003 | Sonnenberg | |
| 6,564,222 B1 * | 5/2003 | Sassano ....................... | 1/1 |
| 6,721,736 B1 * | 4/2004 | Krug et al. .................. | 1/1 |
| 6,735,577 B2 * | 5/2004 | Zuse ............................ | 706/12 |
| 6,829,599 B2 | 12/2004 | Chidlovshi | |
| 7,003,506 B1 * | 2/2006 | Fisk et al. .................. | 1/1 |
| 7,051,014 B2 * | 5/2006 | Brill et al. .................. | 1/1 |
| 7,165,080 B2 * | 1/2007 | Kotcheff et al. ............ | 1/1 |
| 7,289,806 B2 * | 10/2007 | Morris et al. ............ | 455/432.3 |
| 7,363,282 B2 * | 4/2008 | Karnawat et al. ............ | 706/45 |
| 2002/0152222 A1 * | 10/2002 | Holbrook ................... | 707/104.1 |
| 2003/0009497 A1 * | 1/2003 | Yu ............................. | 707/513 |
| 2003/0024975 A1 | 2/2003 | Rajasekharan | |
| 2003/0039410 A1 * | 2/2003 | Beeman et al. ............ | 382/305 |
| 2003/0229628 A1 * | 12/2003 | Banerjee et al. ............ | 707/3 |
| 2004/0054428 A1 | 3/2004 | Sheha et al. | |
| 2004/0064526 A1 * | 4/2004 | Lee et al. .................. | 709/217 |
| 2004/0177376 A1 * | 9/2004 | Caspi et al. ................ | 725/81 |
| 2004/0215593 A1 * | 10/2004 | Sharangpani et al. ........ | 707/1 |
| 2004/0217884 A1 | 11/2004 | Samadani et al. | |
| 2004/0218910 A1 | 11/2004 | Chang et al. | |
| 2004/0225635 A1 * | 11/2004 | Toyama et al. ............ | 707/1 |
| 2004/0260695 A1 * | 12/2004 | Brill ........................... | 707/5 |
| 2005/0027507 A1 * | 2/2005 | Patrudu ....................... | 704/1 |
| 2005/0060311 A1 * | 3/2005 | Tong et al. .................. | 707/7 |
| 2005/0125390 A1 * | 6/2005 | Hurst-Hiller et al. ......... | 707/3 |

(Continued)

FOREIGN PATENT DOCUMENTS

EP 1128284 A2 8/2001

(Continued)

OTHER PUBLICATIONS

Anthony Petro, "Creating a Site Context Search Box that Uses SharePoint Portal Server Search Results," Microsoft Corporation, Published Sep. 2004.*

(Continued)

*Primary Examiner*—Shahid A Alam
*Assistant Examiner*—Alexandria Y Bromell (57) ABSTRACT

Media-driven browsing methods, systems, and machine-readable instructions are described. In one aspect, a context search is performed based on information associated with at least one media object. A context-sensitive search is performed based on results of the context search. Information derived from results of the context-sensitive search is presented.

16 Claims, 8 Drawing Sheets

U.S. PATENT DOCUMENTS

| | | | |
|---|---|---|---|
| 2005/0132269 A1* | 6/2005 | Chakraborty | 715/513 |
| 2005/0149496 A1* | 7/2005 | Mukherjee et al. | 707/3 |
| 2005/0154711 A1* | 7/2005 | McConnell | 707/3 |
| 2005/0163378 A1* | 7/2005 | Chen | 382/190 |
| 2005/0187920 A1* | 8/2005 | Tenembaum et al. | 707/3 |
| 2005/0246314 A1* | 11/2005 | Eder | 707/1 |
| 2005/0262081 A1* | 11/2005 | Newman | 707/9 |
| 2006/0085750 A1* | 4/2006 | Easton et al. | 715/708 |
| 2006/0100989 A1* | 5/2006 | Chinchwadkar et al. | 707/3 |
| 2006/0106874 A1* | 5/2006 | Victor et al. | 707/104.1 |
| 2006/0136391 A1* | 6/2006 | Morris | 707/3 |
| 2006/0184625 A1* | 8/2006 | Nordvik et al. | 709/204 |
| 2007/0033179 A1* | 2/2007 | Tenembaum et al. | 707/4 |
| 2009/0112857 A1* | 4/2009 | Tong et al. | 707/5 |

FOREIGN PATENT DOCUMENTS

WO     WO02/33955 A2     4/2002

OTHER PUBLICATIONS

Mor Naaman et al., "From Where to What: Metadata Sharing for Digital Photographs with Geographic Coordinates," 10th Intl. Conf. on Cooperative Information Systems, 2003.

\* cited by examiner

MEDIA-DRIVEN BROWSING

BACKGROUND

Individuals and organizations are rapidly accumulating large and diverse collections of media, including text, audio, graphics, animated graphics and full-motion video. This content may be presented individually or combined in a wide variety of different forms, including documents, presentations, music, still photographs, commercial videos, home movies, and metadata describing one or more associated media files. As these collections grow in number and diversity, individuals and organizations increasingly will require systems and methods for organizing and browsing the media in their collections. To meet this need, a variety of different systems and methods for browsing media have been proposed, including systems and methods for content-based media browsing and meta-data-based media browsing.

In addition to information in their own collections, individuals and organizations are able to access an ever-increasing amount of information that is stored in a wide variety of different network-based databases. For example, the internet provides access to a vast number of databases. Web pages are one of the most common forms of internet content is provided by the world-wide web (the "Web"), which is an internet service that is made up of server-hosting computers known as "Web servers". A Web server stores and distributes Web pages, which are hypertext documents that are accessible by Web browser client programs. Web pages are transmitted over the internet using the HTTP protocol.

Search engines enable users to search for web page content that is available over the internet. Search engines typically query searchable databases that contain indexed references (i.e., Uniform Resource Locators (URLs)) to Web pages and other documents that are accessible over the internet. In addition to URLs, these databases typically include other information relating to the indexed documents, such as keywords, terms occurring in the documents, and brief descriptions of the contents of the documents. The indexed databases relied upon by search engines typically are updated by a search program (e.g., "web crawler," "spider," "ant," "robot," or "intelligent agent") that searches for new Web pages and other content on the Web. New pages that are located by the search program are summarized and added to the indexed databases.

Search engines allow users to search for documents that are indexed in their respective databases by specifying keywords or logical combinations of keywords. The results of a search query typically are presented in the form of a list of items corresponding to the search query. Each item typically includes a URL for the associated document, a brief description of the content of the document, and the date of the document. The search results typically are ordered in accordance with relevance scores that measure how closely the listed documents correspond to the search query.

Hitherto, media browsers and search engines have operated in separate domains: media browsers enable users to browse and manage their media collections, whereas search engines enable users to perform keyword searches for indexed information that in many cases does not include the users' personal media collections. What is needed is a media-driven browsing approach that leverages the services of search engines to enable users to serendipitously discover information related to the media in their collections.

SUMMARY

In one aspect, the invention features a machine-implemented browsing method in accordance with which a context search is performed based on information associated with at least one media object. A context-sensitive search is performed based on results of the context search. Information derived from results of the context-sensitive search is presented.

The invention also features a system and machine-readable instructions for implementing the above-described browsing method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

Figure 1:
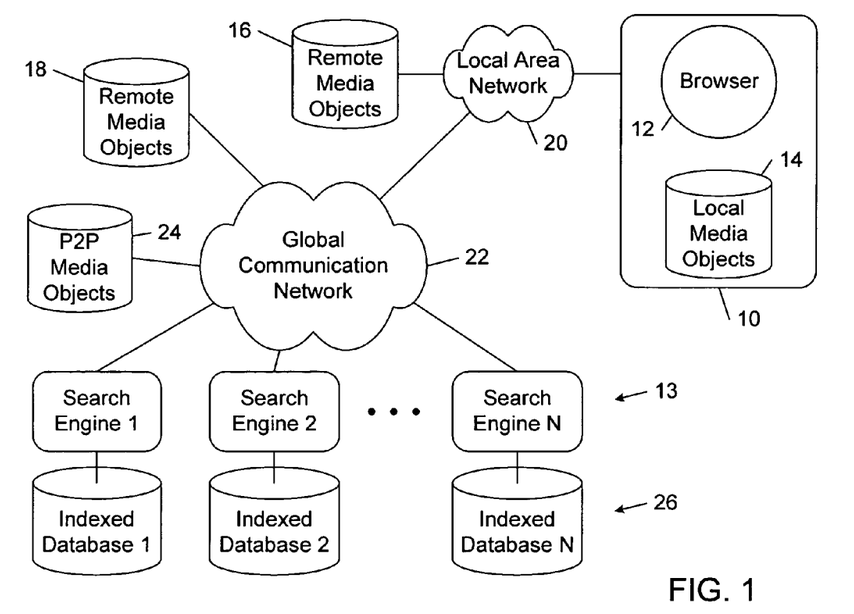
FIG. 1 is a diagrammatic view of an embodiment of a media-driven browser that is connected to a set of local media files, multiple sets of remote media objects, and multiple search engines.

FIG. 1 shows an embodiment of a network node 10 that includes a media-driven browser 12 that enables users to serendipitously discover information related to media objects in their collections by leveraging the functionalities of a number of search engines 13. As explained in detail below, the media-driven browser 12 automatically obtains information related to one or more selected media objects by performing targeted searches based at least in part on information associated with the selected media objects. In this way, the media-driven browser 12 enriches and enhances the context in which users experience the media objects in their collections.

The media objects in a user's collection may be stored physically in a local database 14 of the network node 10 or in one or more remote databases 16, 18 that may be accessed over a local area network 20 and a global communication network 22, respectively. The media objects in the remote database 18 may be provided by a service provider free-of-charge or in exchange for a per-item fee or a subscription fee. Some media objects also may be stored in a remote database 24 that is accessible over a peer-to-peer (P2P) network connection.

As used herein, the term "media object" refers broadly to any form of digital content, including text, audio, graphics, animated graphics, full-motion video and electronic proxies for physical objects. This content is implemented as one or more data structures that may be packaged and presented individually or in some combination in a wide variety of different forms, including documents, annotations, presentations, music, still photographs, commercial videos, home movies, and metadata describing one or more associated digital content files. As used herein, the term "data structure" refers broadly to the physical layout (or format) in which data is organized and stored.

In some embodiments, digital content may be compressed using a compression format that is selected based upon digital content type (e.g., an MP3 or a WMA compression format for audio works, and an MPEG or a motion JPEG compression format for audio/video works). Digital content may be transmitted to and from the network node 10 in accordance with any type of transmission format, including a format that is suitable for rendering by a computer, a wireless device, or a voice device. In addition, digital content may be transmitted to the network node 10 as a complete file or in a streaming file format. In some cases transmissions between the media-driven browser 12 and applications executing on other network nodes may be conducted in accordance with one or more conventional secure transmission protocols.

The search engines 13 respond to queries received from the media-driven browser 12 by querying respective databases 26 that contain indexed references to Web pages and other documents that are accessible over the global communication network 22. The queries may be atomic or in the form of a continuous query that includes a stream of input data. The results of continuous queries likewise may be presented in the form of a data stream. Some of the search engines 13 provide specialized search services that are narrowly tailored for specific informational domains. For example, the MapPoint® Web service provides location-based services such as maps, driving directions, and proximity searches, the Delphion™ Web service provides patent search services, the BigYellow™ Web service provides business, products and service search services, the Tucows Web services provides software search services, the CareerBuilder.com™ Web service provides jobs search services, and the MusicSearch.com™ Web service provides music search services. Other ones of the search engines 13, such as Google™, Yahoo™, AltaVista™, Lycos™, and Excite™, provide search services that are not limited to specific informational domains. Still other ones of the search engines 13 are meta-search engines that perform searches using other search engines. The search engines 13 may provide access to their search services free-of-charge or in exchange for a fee.

Global communication network 22 may include a number of different computing platforms and transport facilities, including a voice network, a wireless network, and a computer network (e.g., the internet). Search queries from the media-driven browser 12 and search responses from the search engines 13 may be transmitted in a number of different media formats, such as voice, internet, e-mail and wireless formats. In this way, users may access the search services provided by the search engines 13 using any one of a wide variety of different communication devices. For example, in one illustrative implementation, a wireless device (e.g., a wireless personal digital assistant (PDA) or cellular telephone) may connect to the search engines 13 over a wireless network. Communications from the wireless device may be in accordance with the Wireless Application Protocol (WAP). A wireless gateway converts the WAP communications into HTTP messages that may be processed by the search engines 13. In another illustrative implementation, a software program operating at a client personal computer (PC) may access the services of search engines over the internet.

II. ARCHITECTURE

Figure 2:
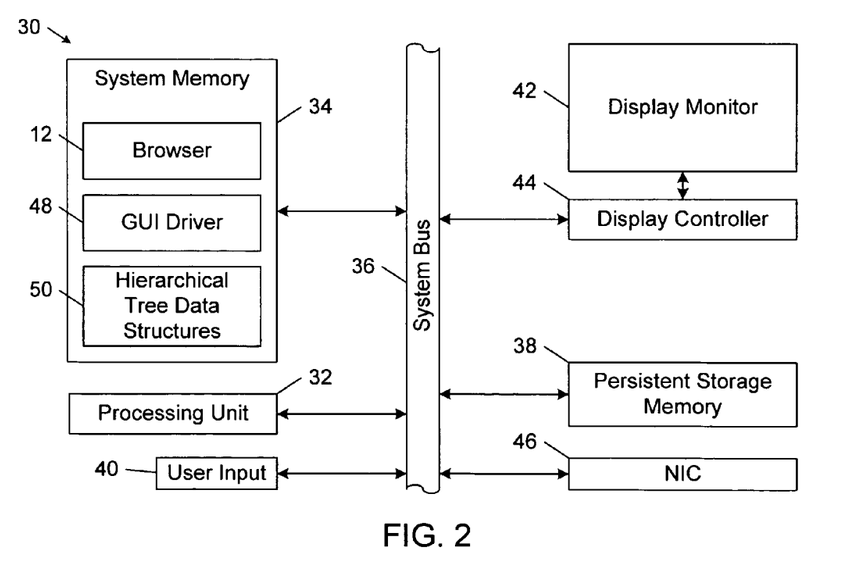
FIG. 2 is a diagrammatic view of an embodiment of a computer system that is programmed to implement the media-driven browser shown in FIG. 1.

Referring to FIG. 2, in one embodiment, the media-driven browser 12 may be implemented as one or more respective software modules operating on a computer 30. Computer 30 includes a processing unit 32, a system memory 34, and a system bus 36 that couples processing unit 32 to the various components of computer 30. Processing unit 32 may include one or more processors, each of which may be in the form of any one of various commercially available processors. System memory 34 may include a read-only memory (ROM) that stores a basic input/output system (BIOS) containing start-up routines for computer 30 and a random access memory (RAM). System bus 36 may be a memory bus, a peripheral bus or a local bus, and may be compatible with any of a variety of bus protocols, including PCI, VESA, Microchannel, ISA, and EISA. Computer 30 also includes a persistent storage memory 38 (e.g., a hard drive, a floppy drive, a CD ROM drive, magnetic tape drives, flash memory devices, and digital video disks) that is connected to system bus 36 and contains one or more computer-readable media disks that provide non-volatile or persistent storage for data, data structures and computer-executable instructions. A user may interact (e.g., enter commands or data) with computer 30 using one or more input devices 40 (e.g., a keyboard, a computer mouse, a microphone, joystick, and touch pad). The media-driven browser 12 presents information to and receives information from a user through a graphical user interface (GUI) that is displayed to the user on a display monitor 42, which is controlled by a display controller 44. Computer 30 also may include peripheral output devices, such as speakers and a printer. One or more remote computers may be connected to computer 30 through a network interface card (NIC) 46.

As shown in FIG. 2, system memory 34 also stores the media-driven browser 12, a GUI driver 48, and one or more hierarchical tree data structures 50, which may be stored, for example, in an XML (eXtensible Markup Language) file format. The media-driven browser 12 interfaces with the GUI driver 48 and the user input 40 to respond to user commands and selections. The media-driven browser 12 also interfaces with the GUI driver 48 and the hierarchical tree data structures 50 to control the browsing experience that is presented to the user on display monitor 42. The media objects in the collection to be browsed may be stored locally in persistent storage memory 38 or stored remotely and accessed through NIC 46, or both.

III. USER INTERFACE

Figure 3:
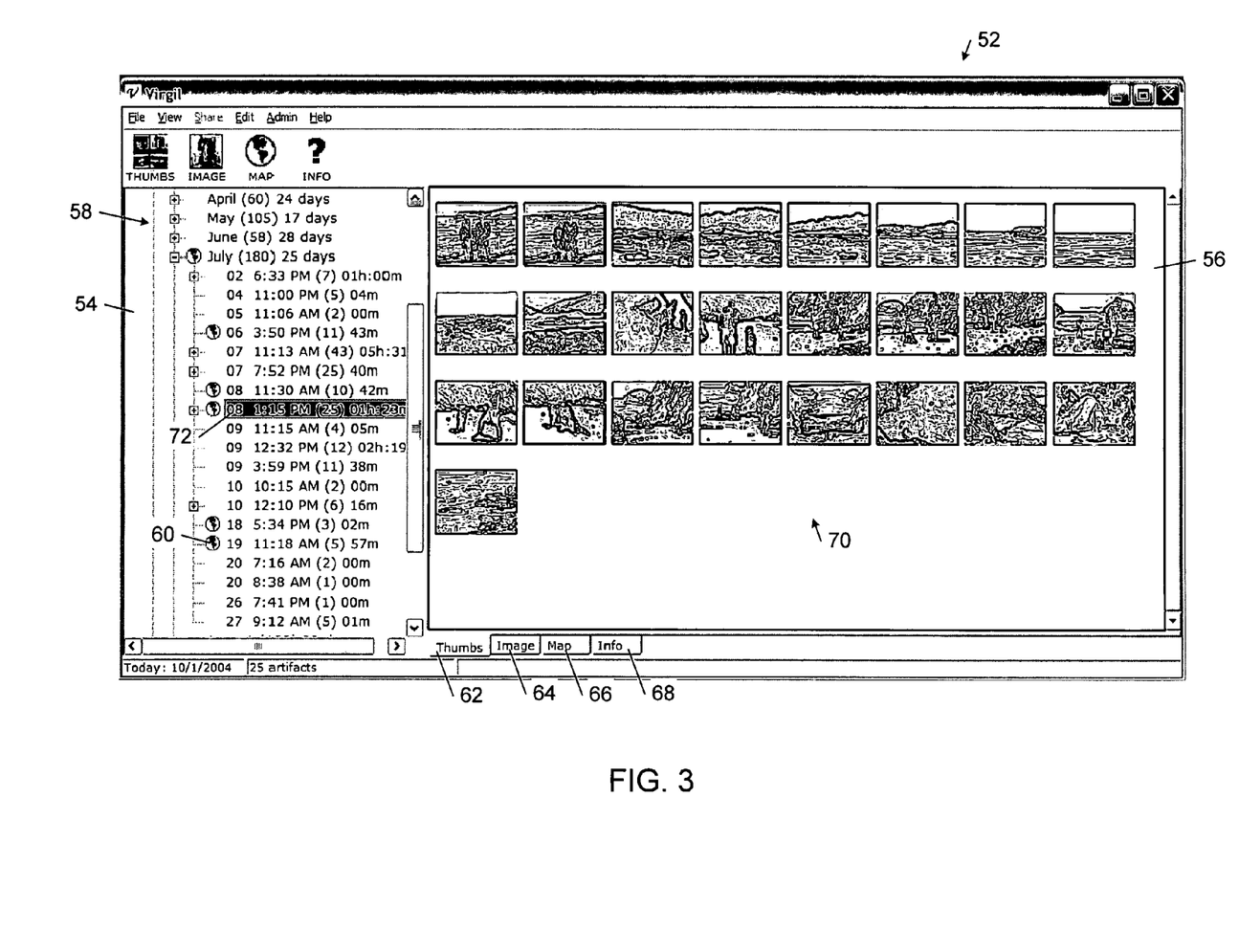
FIG. 3 is a diagrammatic view of an embodiment of a graphical user interface displaying a set of thumbnail images selected from a hierarchical tree.

FIG. 3 shows an embodiment of a graphical user interface 52 through which the media-driven browser 12 presents information to and receives information from a user.

A user initializes the media-driven browser 12 by selecting a command that causes the media-driven browser 12 to automatically scan for one or more different types of media objects in one or more default or specified local or remote file locations. The set of media objects that is identified by the media-driven browser 12 constitutes an active media object collection. The active media object collection may be changed by adding or removing media objects from the collection in accordance with user commands. During the scanning process, the media-driven browser 12 computes thumbnail representations of the media objects and extracts metadata and other parameters that are associated with the media objects.

Once the media-driven browser 12 has been initialized, the graphical user interface 52 presents information related to the active collection of media objects in two primary areas: a hierarchical tree pane 54 and a presentation pane 56.

The hierarchical tree pane 54 presents clusters of the media objects in the collection organized into a logical tree structure, which correspond to the hierarchical tree data structures 50. In general, the media objects in the collection may be clustered in any one of a wide variety of ways, including by spatial, temporal or other properties of the media objects. The media objects may be clustered using, for example, k-means clustering or some other clustering method. In the illustrated embodiment, the media-driven browser 12 clusters the media objects in the collection in accordance with timestamps that are associated with the media objects, and then presents the clusters in a chronological tree structure 58. The tree structure 58 is organized into a hierarchical set of nested nodes corresponding to the year, month, day, and time of the temporal metadata associated with the media objects, where the month nodes are nested under the corresponding year nodes, the day nodes are nested under the corresponding month nodes, and the time nodes are nested under the corresponding day nodes. Each node in the tree structure 58 includes a temporal label indicating one of the year, month, day, and time, as well as a number in parentheses that indicates the number of media objects in the corresponding cluster. The tree structure 58 also includes an icon 60 (e.g., a globe in the illustrated embodiment) next to each of the nodes that indicates that one or more of the media objects in the node includes properties or metadata from which one or more contexts may be created by the media-driven browser 12. Each node also includes an indication of the duration spanned by the media objects in the corresponding cluster.

The presentation pane 56 presents information that is related to one or more media objects that are selected by the user. The presentation pane 56 includes four tabbed views: a "Thumbs" view 62, an "Images" view 64, a "Map" view 66, and an "Info" view 68. Each of the tabbed views 62-68 presents a different context that is based on the cluster of images that the user selects in the hierarchical tree pane 54.

The Thumbs view 62 shows thumbnail representations 70 of the media objects in the user-selected cluster. In the exemplary implementation shown in FIG. 3, the selected cluster is the twenty-five member, July $8^{th}$ cluster 72, which is highlighted in the hierarchical tree pane 54. In the illustrated embodiment, each of the media objects in the selected cluster 72 is a digital image and each of the thumbnail representations 70 presented in the Thumbs view 62 is a reduced-resolution thumbnail image of the corresponding media object. Other media objects may have different thumbnail representations 70. For example, a video media object may be represented by a thumbnail image of the first keyframe that is extracted from the video media object. A text document may be represented by a thumbnail image of the first page of the document. An audio media object may be represented by an audio icon along with one or more keywords that are extracted form the audio media object. In the illustrated embodiment, the thumbnail representations 70 are presented chronologically in the presentation pane 56. In other embodiments, the user may sort the thumbnail representations 70 in accordance with one or more other properties or metadata (e.g., geographical data) that are associated with the media objects in the collection.

In some implementations, a user can associate properties with the media objects in the selected cluster 72 by dragging and dropping text, links, or images onto the corresponding thumbnail representations. In addition, the user may double-click a thumbnail representation 70 to open the corresponding media object in a full-screen viewer. Once in the full-screen viewer, the user may view adjacent media objects in the full-screen viewer by using, for example, the left and right arrow keys.

Figure 4:
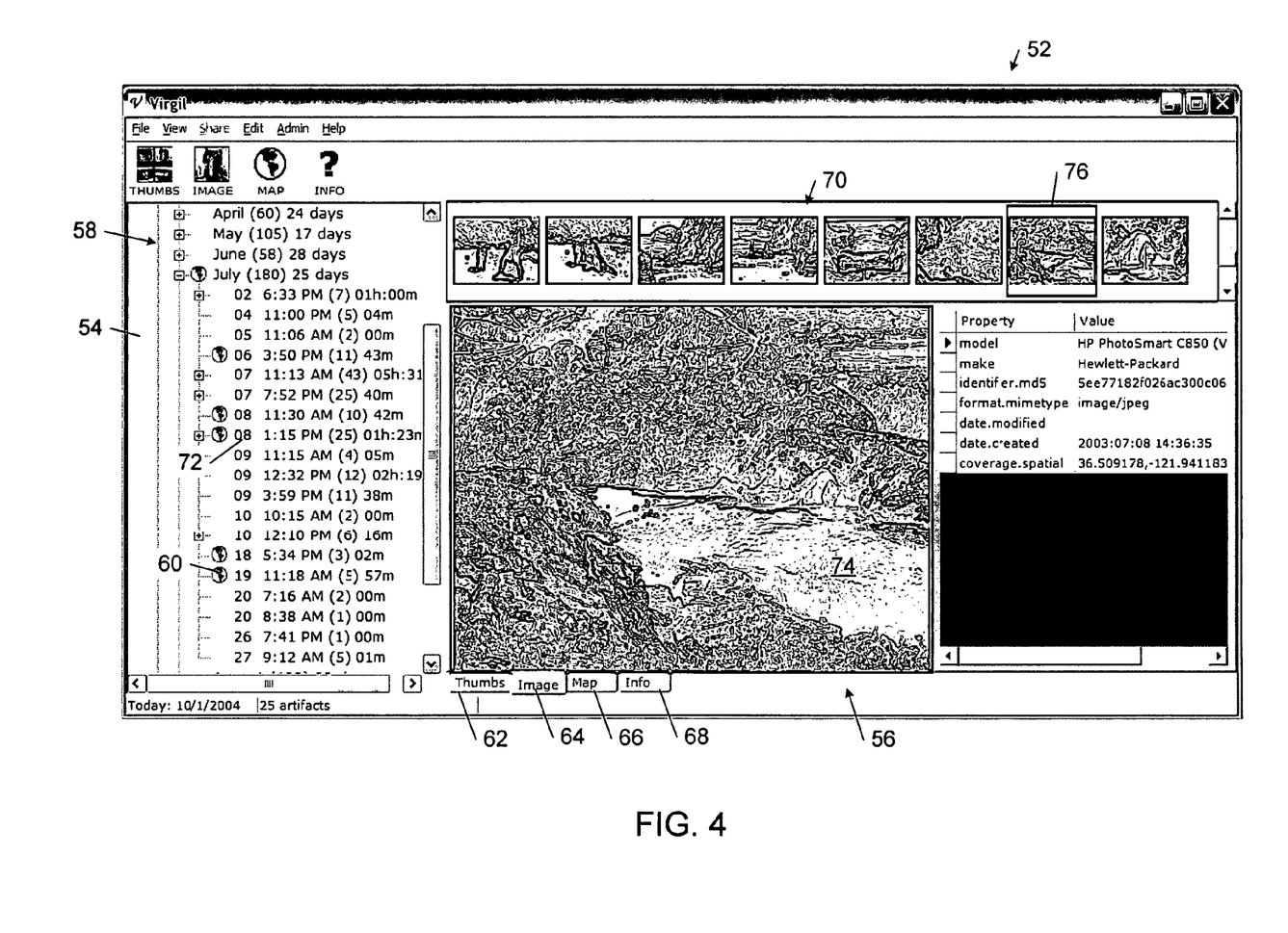
FIG. 4 is a diagrammatic view of an embodiment of a graphical user interface displaying a high-resolution image corresponding to a selected thumbnail image.
Figure 5:
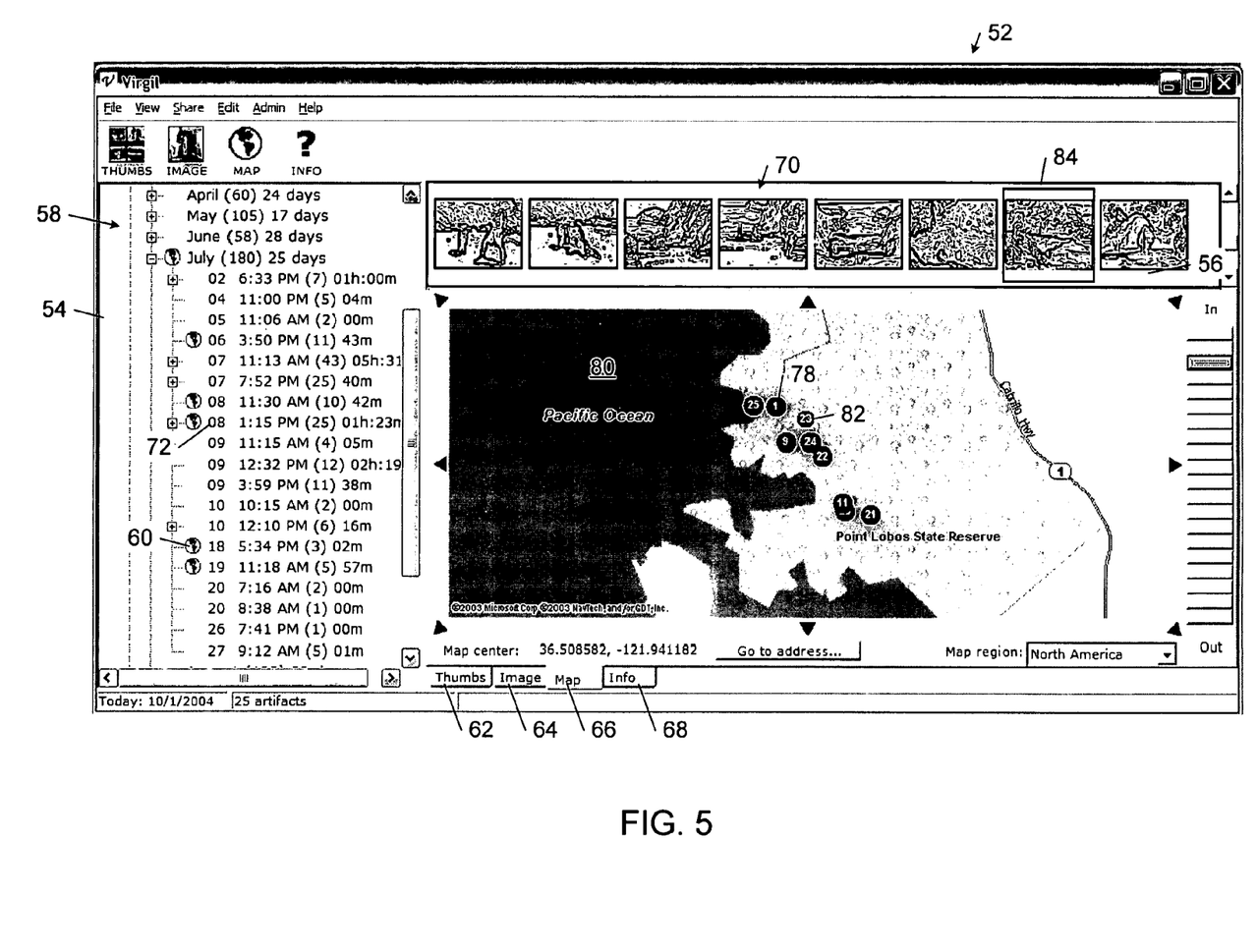
FIG. 5 is a diagrammatic view of an embodiment of a graphical user interface displaying on a map the geographical locations associated with a selected set of image media objects.

Referring to FIG. 4, the Image view 64 shows at the top of the presentation pane 56 a single row of the thumbnail representations 70 in the selected media object cluster 72. The image view 64 also shows an enlarged, higher-resolution view 74 of a selected media object corresponding to a selected one 76 of the thumbnail representations 70, along with a list of properties that are associated with the selected media object. Among the exemplary media object properties that are associated with the selected media object are:

model: the model of the device used to create the media object
    make: the make of the device
    identifier: an identifier (e.g., a fingerprint or message digest derived from the media object using an method, such as MD5) assigned to the media object
    format.mimetype: a format identifier and a Multipart Internet Mail Extension type corresponding to the media object
    date.modified: the last modification date of the media object
    date.created: the creation date of the media object
    coverage.spatial: geographical metadata associated with the media object Referring to FIG. 5, the Map view 66 shows at the top of the presentation pane 56 a single row of the thumbnail representations 70 in the selected media object cluster 72. The Map view 64 also shows geo-referenced ones of the media objects in the selected cluster 72 (i.e., the media objects in the selected cluster 72 that are associated with geographical metadata) as numbered circles 78 on a zoom and pan enabled map 80. The numbers in the circles 78 indicate the temporal order of the geo-referenced media objects. When a user selects one of the circles 78 (e.g., circle 82), the media-driven browser 12 highlights the selected circle 82, scrolls to the corresponding thumbnail representation 70, and highlights the corresponding thumbnail representation 70 (e.g., with an encompassing rectangle 84). The user may assign a location to a selected one of the media objects, by centering the map 80 on the location and selecting an Assign Location command, which is available on the Edit drop down menu. In some implementations, geographical metadata may be associated with the media objects in the selected cluster 72 by importing data from a GPS tracklog that was recorded while the media objects were being created. The recorded GPS data may be associated with corresponding ones of the media objects in any one of a wide variety of ways (e.g., by matching timestamps that are associated with the media objects to timestamps that were recorded with the GPS data). Selecting the "Go to address" button causes the media-driven browser 12 to pan to a location specified by entering a full or partial street address.

Figure 6:
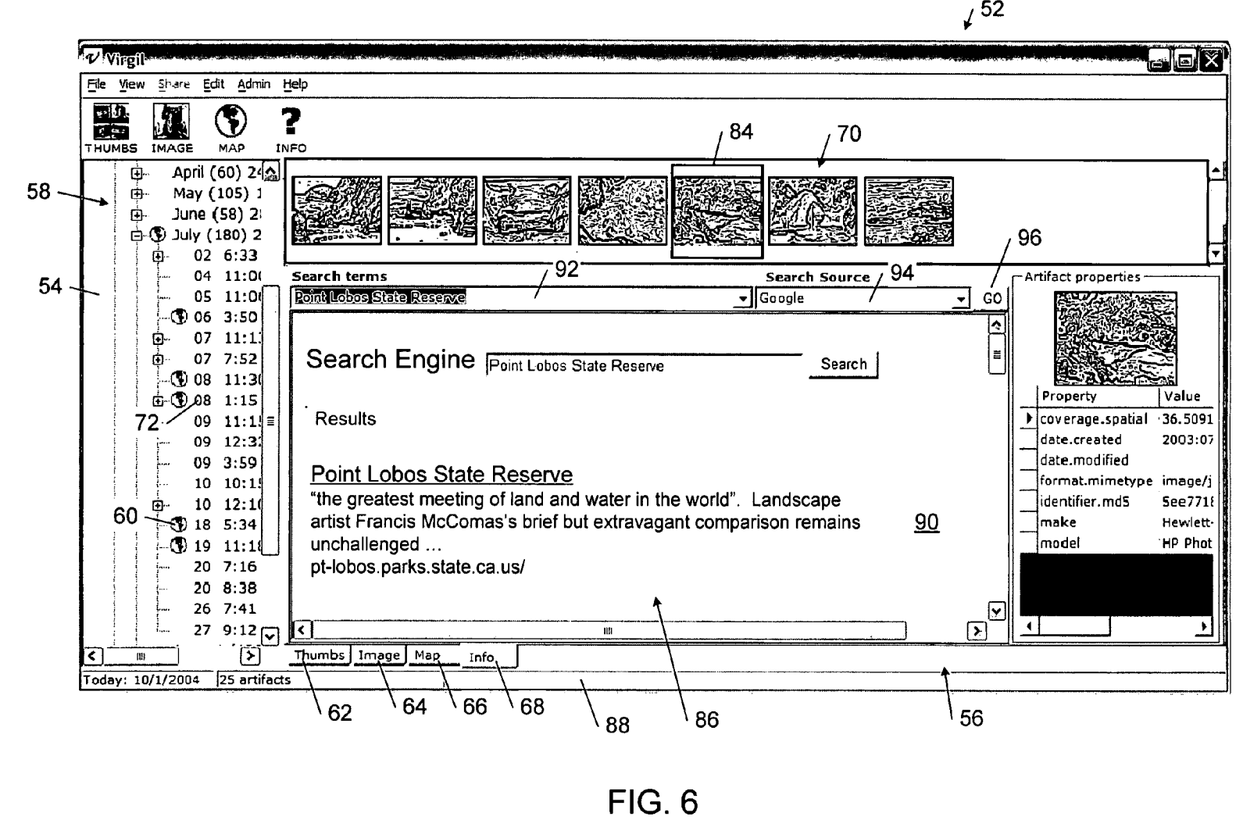
FIG. 6 is a diagrammatic view of an embodiment of a graphical user interface presenting information that is derived from results of a context-sensitive search.

Referring to FIG. 6, the Info view 68 shows at the top of the presentation pane 56 a single row of the thumbnail representations 70 in the selected media object cluster 72, along with a list of properties ("Artifact properties") that are associated with the media object corresponding to a selected one 84 of the thumbnail representations 70. The Info view 64 also shows context-sensitive information 86 relating to the selected media object that is obtained by leveraging the functionalities of the search engines 13, as explained in section IV below. The selected media object corresponds to either the media object corresponding to the selected thumbnail representation 84 or, if none of the thumbnail representations 70 has been selected, a default summary object that represents the cluster. The default summary object may be generated from the objects in the selected cluster either automatically or in response to a user command. If none of the media objects in the selected cluster has been selected or there is no default summary object, the user is notified that a context could not be created by a message in a status bar 88. Alternatively, the media-driven browser 12 may suggest one or more of the media objects in the selected cluster 72 as candidates for the selected media object.

The context-sensitive information 86 is presented in a search pane 90 that includes a "Search terms" drop down menu 92 and a "Search Source" drop down menu 94. The Search terms drop down menu 92 includes a list of context-sensitive search queries that are generated by the media-driven browser 12 and ordered in accordance with a relevance score. The Search Source drop down menu 94 specifies the source of the context-sensitive information that is retrieved by the media-driven browser 12. Among the exemplary types of sources are general-purpose search engines (e.g., Google™, Yahoo™, AltaVista™, Lycos™, and Excite™) and specialized search engines (e.g., MapPoint®, Geocaching.com™, Delphion™, BigYellow™, Tucows, CareerBuilder.com™, and MusicSearch.com™). The Search Sources are user-configurable and can be configured to perform searches based on media object metadata (including latitude/longitude) using macros. In some cases, the {TERMS} macro may be used to automatically insert the value of the Search terms in the search query input of the selected search engine may be used to insert the latitude and longitude of the current media object). Search sources that do not include the {TERMS} macro will ignore the current Search terms value. Searches are executed automatically when the selected media object is changed, the selected time cluster is changed, the Info tab 68 is selected, when the Search terms 92 or Search Source 94 selections are changed, and when the GO button 96 is selected. The Search terms selection can be modified to improve the search results. For example, some point-of-interest names, like "Old City Hall", are too general. In this case, the search terms may be refined by adding one or more keywords (e.g., "Philadelphia") to improve the search results.

IV. MEDIA-DRIVEN BROWSING

Figure 7:
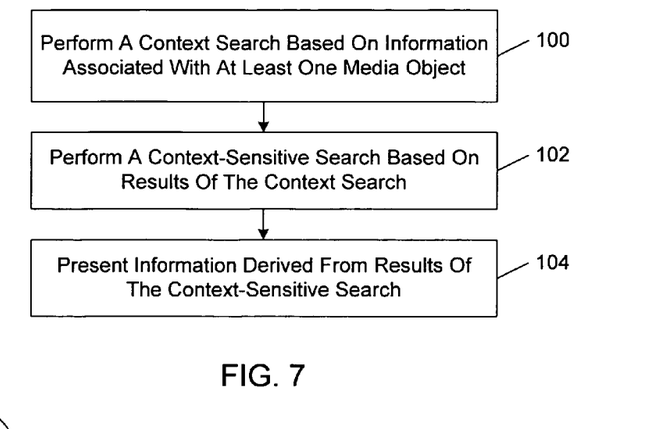
FIG. 7 is a flow diagram of an embodiment of a media-driven browsing method.

As explained in detail below, the media-driven browser 12 is a contextual browser that presents contexts that are created by information that is related to selected ones of the media objects in a collection. FIG. 7 shows an embodiment of a method by which the media-driven browser 12 creates the contexts that are presented in the Info view 68 of the graphical user interface 52.

The media-driven browser 12 performs a context search based on information that is associated with at least one media object (block 100). In general, the media-driven browser 12 identifies the related contextual information based on information that is associated with the media objects, including intrinsic features of the media objects and metadata that is associated with the media objects. In this regard, the media-driven browser 12 extracts information from the media object and generates a context search query from the extracted information. The media-driven browser 12 transmits the context query search to at least one of the search engines 13. In some implementations, the context query search is transmitted to ones of the search engines 13 that specialize in the informational domain that is most relevant to the criteria in the context query search. For example, if the context query search criteria relates to geographical information, the context query search may be transmitted to a search engine, such as MapPoint® or Geocaching.com™, that is specially tailored to provide location-related information. If the context query search criteria relates to music, the context query search may be transmitted to a search engine, such as MusicSearch.com™, that is specially tailored to provide music-related information. In other implementations, the context query search may be transmitted to one or more general-purpose search engines.

Based on the results of the context search (block 100), the media-driven browser 12 performs a context-sensitive search (block 102). In this regard, the media-driven browser 12 generates a context-sensitive search query from the results of the context search and transmits the context-sensitive search query to one or more of the search engines 13. The ones of the search engines 13 to which the context-sensitive search query are transmitted may be selected by the user using the Search Source 94 drop down menu or may be selected automatically by the media-driven browser 12.

The media-driven browser 12 then presents information that is derived from the results of the context-sensitive search in the Info view 68 of the graphical user interface 52 (block 104). In this regard, the media-driven browser 12 may reformat the context-sensitive search response that is received from the one or more search engines 13 for presentation in the Info view 68. Alternatively, the media-driven browser 12 may compile the presented information from the context-sensitive search response. In this process, the media-driven browser 12 may perform one or more of the following operations: re-sort the items listed in the search response, remove redundant items from the search response, and summarize one or more items in the search response.

Figure 8:
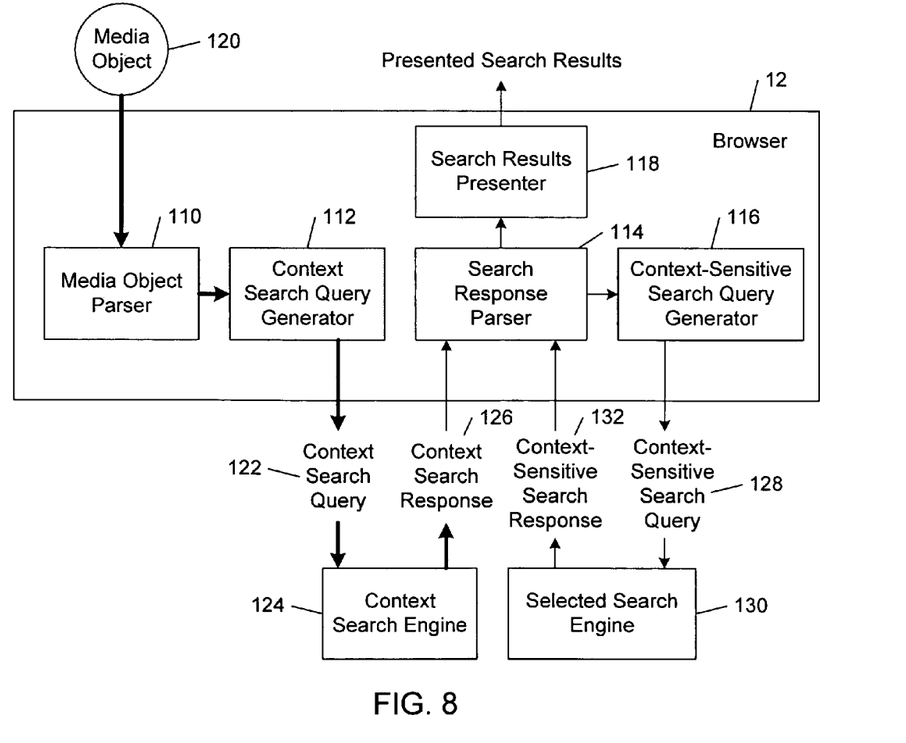
FIG. 8 shows data flow through a first portion of an implementation of the media-driven browser shown in FIG. 1.
Figure 9:
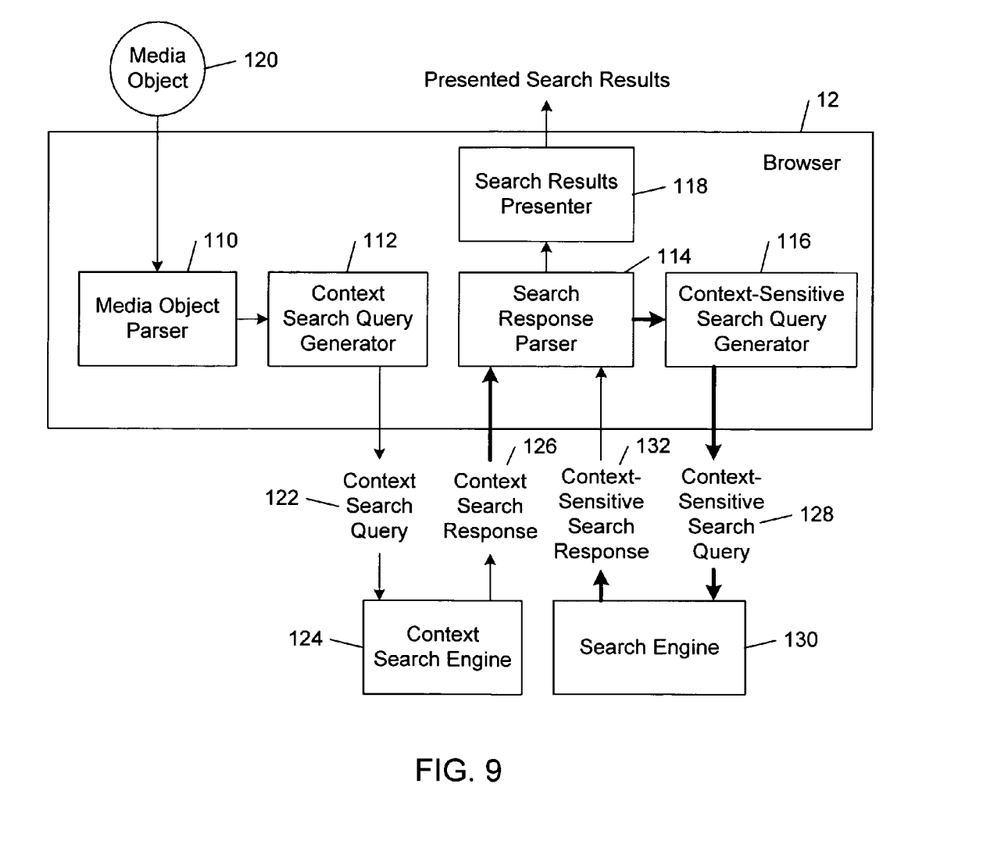
FIG. 9 shows data flow through a second portion of the implementation of the media-driven browser shown in FIG. 8.
Figure 10:
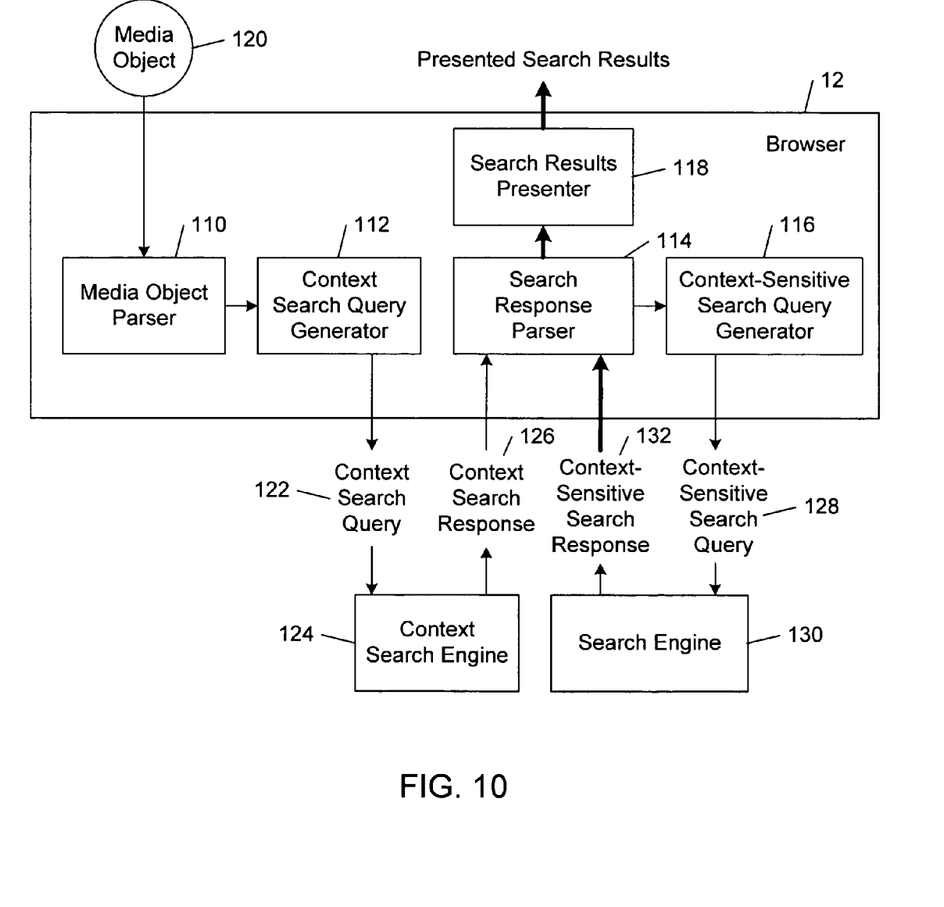
FIG. 10 shows data flow through a third portion of the implementation of the media-driven browser shown in FIG. 8.

FIGS. 8-10 show the data flow through an implementation of the media-driven browser 12 during execution of the media-driven browsing method of FIG. 7. In this implementation, the media driven browser includes a media object parser 110, a context search query generator 112, a search response parser 114, a context-sensitive search query generator 116, and a search results presenter 118. In general, these components are not limited to any particular hardware or software configuration, but rather they may be implemented in any computing or processing environment, including in digital electronic circuitry or in computer hardware, firmware, or software. In some embodiments, these components are implemented by a computer process product that is tangibly embodied in a machine-readable storage device for execution by a computer processor. The method of FIG. 7 may be performed by a computer processor executing instructions organized, for example, into the process modules 110-

118 that carry out the steps of this method by operating on input data and generating output.

The data flow involved in the process of performing the context search (block 100; FIG. 7) is shown highlighted in FIG. 8.

In this process, the media object parser 110 extracts information from a media object 120. In some implementations, the extracted information may relate at least one of intrinsic properties of the media object 120, such as image features (e.g., if the media object 120 includes an image) or text features (e.g., if the media object 120 includes text), and metadata associated with the media object 120. In these implementations, the media object parser 110 includes one or more processing engines that extract information from the intrinsic properties of the media object. For example, the media object parser 110 may include an image analyzer that extracts color-distribution metadata and from image-based media objects or a machine learning and natural language analyzer that extracts keyword metadata from document-based media objects. In some implementations, the extracted information may be derived from metadata that is associated with the media object 120, including spatial, temporal and spatiotemporal metadata (or tags) that are associated with the media object 120. In these implementations, the media object parser 110 includes a metadata analysis engine that can identify and extract metadata that is associated with the media object 120.

The media object parser 110 passes the information that is extracted from the media object 120 to the context search query generator 112. In some implementations, the context search query generator 112 also may receive additional information, such as information relating to the current activities of the user. The context search query generator 112 generates the context search query 122 from the information that is received. In this process, the context search query generator 112 compiles the context search query 122 from the received information and translates the context search query into the native format of a designated context search engine 124 that will be used to execute the context search query 122. The translation process includes converting specific search options into the native syntax of the context search engine 124.

The context search engine 124 identifies in its associated indexed database items corresponding to the criteria specified in the context search query 122. The context search engine 124 then returns to the media-driven browser 12 a context search response 126 that includes a list of each of the identified items, along with a URL, a brief description of the contents, and a date associated with each of the listed items.

The data flow involved in the process of performing the context-sensitive search (block 102; FIG. 7) is shown highlighted in FIG. 9. The search response parser 114 receives the context search response 126 from the context search engine 124. The search response parser 114 then extracts information from the context search response 126. In this process, the search response parser 114 separates the results of the context search from other items that might be incorporated in the context search response 126, including advertisements and other extraneous information.

The search response parser 114 passes the information extracted from the context search response 126 to the context-sensitive search query generator 116. The context-sensitive search query generator 116 generates a context-sensitive search query 128 from the extracted information received from the search response parser 114. In this process, the context-sensitive search query generator 116 compiles the context-sensitive search query 128 from the extracted information and translates the context-sensitive search query 128 into the native format of a selected search engine 130 that will be used to execute the context-sensitive search query 128. The translation process includes converting specific search options into the native syntax of the selected search engine 130.

The context-sensitive search engine 130 identifies in its associated indexed database items corresponding to the criteria specified in the context-sensitive search query 128. The context-sensitive search engine 130 then returns to the media-driven browser 12 a context-sensitive search response 132 that includes a list of each of the identified items, along with a URL, a brief description of the contents, and a date associated with each of the listed items.

The data flow involved in the process of presenting information derived from results of the context search (block 104; FIG. 7) is shown highlighted in FIG. 10. The search response parser 114 receives the context-sensitive search response 132 from the selected search engine 130. The search response parser 114 then extracts information from the context-sensitive search response 132. In this process, the search response parser 114 separates the results of the context-sensitive search from other items that might be incorporated in the context-sensitive search response 132, including advertisements and other extraneous information.

The search response parser 114 passes the information extracted from the context-sensitive search response 132 to the search results presenter 118. The search results presenter 118 presents information that is derived from the results of the context-sensitive search in the Info view 68 of the graphical user interface 52. In this regard, the search results presenter 118 may reformat the extracted components of context-sensitive search response 132 and present the reformatted information in the Info view 68. Alternatively, the search results presenter 118 may compile the presentation information from the extracted components of the context-sensitive search response 132. In this process, the search results presenter 118 may perform one or more of the following operations: re-sort the extracted components; remove redundant information; and summarize one or more of the extracted components.

In some implementations, the search results presenter 118 presents in the Info view 68 only a specified number of the most-relevant ones of extracted components of the context-sensitive search response 132, as determined by relevancy scores that are contained in the context-sensitive search response 132. In some implementations, the search results presenter 118 may determine a set of relevancy scores for the extracted components of the context-sensitive search response 132. In this process, the search results presenter 118 computes feature vectors for the media object and the extracted components. The media object feature vector may be computed from one or more intrinsic features or metadata that are extracted from the media object 120. The search results presenter 118 may determine relevancy scores for the extracted components of the context-sensitive search response 132 based on a measure of the distance separating the extracted component feature vectors from the media object feature vector. In these implementations, any suitable distance measure (e.g., the $L^2$ norm for image-based media objects) may be used.

In other implementations, the search results presenter 118 presents in the Info view 68 only those extracted components of the context-sensitive search response 132 with feature vectors that are determined to be within a threshold distance of the feature vector computed for the media object 120.

V. CONCLUSION

The embodiments that are described herein enable users to serendipitously discover information related to media objects in their collections. In particular, these embodiments automatically obtain information related to one or more selected media objects by performing targeted searches based at least in part on information associated with the selected media objects. In this way, these embodiments enrich and enhance the context in which users experience their media collections.

Other embodiments are within the scope of the claims.

What is claimed is:

1. A machine-implemented browsing method, comprising:
   performing a context search based on information associated with at least one media object, wherein the performing of the context search comprises searching a first database of indexed references to web pages and other documents based on search criteria derived from information extracted from the at least one media object, wherein the performing of the context search further comprises generating a context search query from information associated with the at least one media object, transmitting the context search query to a first search engine operable to query the first database in response to receipt of the context search query, and receiving a first search response from the first search engine;
   performing a context-sensitive search based on results of the context search, wherein the performing of the context-sensitive search comprises searching a second database of indexed references to web pages and other documents based on search criteria derived from the results of the context search, wherein the performing of the context-sensitive search further comprises generating a context-sensitive search query from the first search response, transmitting the context-sensitive search query to a second search engine operable to query the second database in response to receipt of the context-sensitive search query, and receiving a second search response from the second search engine; and
   presenting information derived from results of the context-sensitive search.

2. The method of claim 1, wherein the generating comprises extracting one or more search criteria of the context search query from the associated information.

3. The method of claim 2, wherein the extracting comprises obtaining search criteria from metadata associated with the at least one media object.

4. The method of claim 2, wherein the extracting comprises obtaining at least one keyword from the at least one media object.

5. The method of claim 1, wherein the generating comprises translating the context search query into a native format of the first search engine.

6. The method of claim 1, wherein generating the context-sensitive search query comprises extracting one or more search criteria of the context-sensitive search query from the first search response.

7. The method of claim 6, wherein the extracting comprises obtaining at least one keyword from the first search response.

8. The method of claim 1, wherein the presenting comprises extracting the results of the context-sensitive search from the second search response, and presenting the extracted search results.

9. The method of claim 1, further comprising presenting a list of candidate search engines from which a user selects the second search engine.

10. The method of claim 1, further comprising presenting one or more media objects in a collection.

11. The method of claim 10, wherein the presenting of the one or more media objects comprises presenting a hierarchical tree representing an ordering of the media objects in the collection.

12. The method of claim 11, wherein at least one node of the hierarchical tree represents a cluster of multiple ones of the media objects in the collection.

13. The method of claim 11, wherein the presenting of the one or more media objects comprises presenting ones of the media objects corresponding to a user-selected portion of the hierarchical tree.

14. A machine-implemented browsing method, comprising:
   generating a context search query from meta data associated with at least one image-based media object;
   transmitting the context search query to a first search engine, wherein the generating of the context search query comprises extracting one or more geographic tags associated with the at least one image-based media object, and incorporating information derived from the extracted geographic tags into the context search query;
   receiving a first search response from the first search engine;
   generating a context sensitive search query from the first search response, wherein the generating of the context-sensitive search query comprises extracting from the first search response one or more keywords describing to one or more points of interest identified based on the extracted geographic tags, and incorporating the one or more keywords into the context-sensitive search query;
   transmitting the context-sensitive search query to a second search engine;
   receiving a second search response from the second search engine; and
   presenting information derived from the second search response.

15. A machine-implemented browsing system, comprising:
   a computer-readable medium storing computer-readable instructions, and
   a computer processor coupled to the computer-readable medium, operable to execute the instructions, and based at least in part on the execution of the instructions operable to perform operations comprising:
   performing a context search based on information associated with at least one media object, wherein the performing of the context search comprises searching a first database of indexed references to web pages and other documents based on search criteria derived from the information extracted from the at least one media object, wherein the performing of the context search further comprises generating a context search query from information associated with the at least one media object, transmitting the context search query to a first search engine operable to query the first database in response to receipt of the context search query, and receiving a first search response from the first search engine;
   performing a context-sensitive search based on results on the context search, wherein the performing of the context-sensitive search comprises searching a second database of indexed references to web pages and other documents based on search criteria derived from the results of the context search, wherein the performing of the context-sensitive search further comprises generating a context-sensitive search query from the first search response, transmitting the context-sensitive search query to a second search engine operable to query the second database in response to receipt of the context-sensitive search query, and receiving a second search response from the second search engine; and presenting information derived from results of the context-sensitive search.

16. A machine-readable medium storing machine-readable instructions for causing a machine to perform operations comprising:

performing a context search based on information associated with at least one media object, wherein the performing of the context search comprises searching a first database of indexed references to web pages and other documents based on search criteria derived from information extracted from the media object, wherein the performing of the context search further comprises generating a context search query from information associated with the at least one media object, transmitting the context search query to a first search engine operable to query the first database in response to receipt of the context search query, and receiving a first search response from the first search engine;

performing a context-sensitive search based on results of the context search, wherein the performing of the context-sensitive search comprises searching a second database of indexed references to web pages and other documents based on search criteria derived from the results of the context search, wherein the performing of the context-sensitive search further comprises generating a context-sensitive search query from the first search response, transmitting the context-sensitive search query to a second search engine operable to query the second database in response to receipt of the context-sensitive search query, and receiving a second search response from the second search engine; and presenting information derived from results of the context-sensitive search.

* * * * *